(12) United States Patent
Alperovich et al.

(10) Patent No.: US 6,385,469 B1
(45) Date of Patent: May 7, 2002

(54) SYSTEM AND METHOD FOR PROVIDING BATTERY GAPPING FOR MOBILE STATIONS

(75) Inventors: Vladimir Alperovich, Dallas; Eric Valentine; Walt Evanyk, both of Plano, all of TX (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/337,961

(22) Filed: Jun. 22, 1999

(51) Int. Cl.[7] .................................... H04B 1/38
(52) U.S. Cl. .................... 455/574; 455/343; 455/560; 455/414
(58) Field of Search .......................... 455/574, 572, 455/414, 405, 406, 407, 408, 466, 560, 561, 550, 575, 567, 373

(56) References Cited

U.S. PATENT DOCUMENTS 5,752,195 A * 5/1998 Tsuji et al. ................. 455/462
5,799,256 A * 8/1998 Pombo et al. .............. 455/574
5,949,484 A * 9/1999 Nakaya et al. ............. 348/384
6,078,826 A * 6/2000 Croft et al. ................. 455/574
6,208,851 B1 * 3/2001 Hanson ...................... 455/405

* cited by examiner

Primary Examiner—Nay Maung
Assistant Examiner—Charles Craver
(74) Attorney, Agent, or Firm—Jenkens & Gilchrist, P.C.

(57) ABSTRACT

A telecommunications system and method is disclosed for extending the life of the battery within a Mobile Station (MS), while still allowing the mobile subscriber to use the MS. A new battery gapping feature can be implemented within both the MS 20 and the cellular network. On the MS side, the feature will allow the subscriber to select the desired battery gapping mode, which is a combination of the stand-by mode with the MS power on and the stand-by mode with the MS power off. When in this battery gapping mode, the MS will alternate between power off and power on states depending upon the subscriber defined stand-by times for each of these states. On the network side, the MS will inform the network when the MS powers off, as well as indicate when the MS will be powered on again. Therefore, the network can inform calling parties of the next time that the MS will be reachable.

35 Claims, 9 Drawing Sheets

SYSTEM AND METHOD FOR PROVIDING BATTERY GAPPING FOR MOBILE STATIONS

BACKGROUND OF THE PRESENT INVENTION

Field of the Invention

The present invention relates generally to mobile stations, and more specifically to preserving battery power in mobile stations.

BACKGROUND OF THE PRESENT INVENTION

Cellular telecommunications is one of the fastest growing and most demanding telecommunications applications. Today it represents a large and continuously increasing percentage of all new telephone subscriptions around the world. A standardization group, European Telecommunications Standards Institute (ETSI), was established in 1982 to formulate the specifications for the Global System for Mobile Communication (GSM) digital mobile cellular radio system.

With reference now to FIG. 1 of the drawings, there is illustrated a GSM Public Land Mobile Network (PLMN), such as cellular network 10, which in turn is composed of a plurality of areas 12, each with a Mobile Switching Center (MSC) 14 and an integrated Visitor Location Register (VLR) 16 therein. The MSC 14 provides a circuit switched connection of speech and signaling information between a Mobile Station (MS) 20 and the PLMN 10. The MSC/VLR areas 12, in turn, include a plurality of Location Areas (LA) 18, which are defined as that part of a given MSC/VLR area 12 in which the MS 20 may move freely without having to send update location information to the MSC 14 that controls the LA 18. Each LA 18 is divided into a number of cells 22. The MS 20 is the physical equipment, e.g., a car phone or other portable phone, used by mobile subscribers to communicate with the cellular network 10, each other, and users outside the subscribed network, both wireline and wireless.

The MSC 14 is in communication with at least one Base Station Controller (BSC) 23, which, in turn, is in contact with at least one Base Transceiver Station (BTS) 24. The BTS 24 is the physical equipment, illustrated for simplicity as a radio tower, that provides radio coverage to the cell 22 for which it is responsible. It should be understood that the BSC 23 may be connected to several BTS's 24, and may be implemented as a stand-alone node or integrated with the MSC 14. In either event, the BSC 23 and BTS 24 components, as a whole, are generally referred to as a Base Station System (BSS) 25.

With further reference to FIG. 1, the PLMN Service Area or cellular network 10 includes a Home Location Register (HLR) 26, which is a database maintaining all subscriber information, e.g., user profiles, current location information, International Mobile Subscriber Identity (IMSI) numbers, and other administrative information, for subscribers registered within that PLMN 10. The HLR 26 may be co-located with a given MSC 14, integrated with the MSC 14, or alternatively can service multiple MSCs 14, the latter of which is illustrated in FIG. 1.

Each MS 20 is powered by a rechargeable battery. These batteries retain their charge for only a limited period of time. When the battery life has expired, the mobile subscriber must recharge the battery in order to continue using the MS 20. In many cases, it may be important for a subscriber to prolong the battery life of the MS 20 as long as possible. For example, if the subscriber is traveling in a remote area where sources of electricity are sparse, the subscriber may not be able to recharge the battery when the battery life expires. This may result in missed important calls.

In these situations, the only option for the subscriber is to turn off the MS 20 in order to preserve the battery life. However, if the MS 20 is simply turned off, the subscriber has no ability at all to make or receive calls. In addition, even if the MS 20 is turned off, the battery is still being depleted, although at a lower rate. For example, a sample MS 20 battery may have the following battery life specifications: talk time: 3 hours; stand-by mode with MS 20 power on: 170 hours; stand-by mode with MS 20 power off: 600 hours. Therefore, even if the MS 20 is simply turned off, the battery will still be depleted in 600 hours.

In addition, if the MS 20 is turned off, the subscriber will not be able to make or receive calls or send or receive short messages. Furthermore, calling parties attempting to reach the mobile subscriber with a powered off MS 20 have no way of knowing if or when the mobile subscriber may turn the MS 20 back on. Therefore, the mobile subscriber with the powered off MS 20 may also miss important calls by attempting to preserve the battery life.

SUMMARY OF THE INVENTION

The present invention is directed to telecommunications systems and methods for extending the life of a battery within a Mobile Station (MS), while still allowing a mobile subscriber to use the MS. A new battery gapping feature can be implemented within both the MS 20 and the cellular network. On the MS side, the feature will allow the subscriber to select the desired battery gapping mode, which is a combination of the stand-by mode with the MS power on and the stand-by mode with the MS power off. When in this battery gapping mode, the MS will alternate between power off and power on states depending upon the subscriber defined stand-by times for each of these states. On the network side, the MS will inform the network when the MS powers off, as well as indicate when the MS will be powered on again. Therefore, the network can inform calling parties that place incoming calls to the MS during the time that the MS is powered off of the reason the call is rejected and the next time that the MS will be reachable. In addition, the mobile subscriber can also define a maximum amount of talk time for each incoming call while the MS is powered on, but in battery gapping mode.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
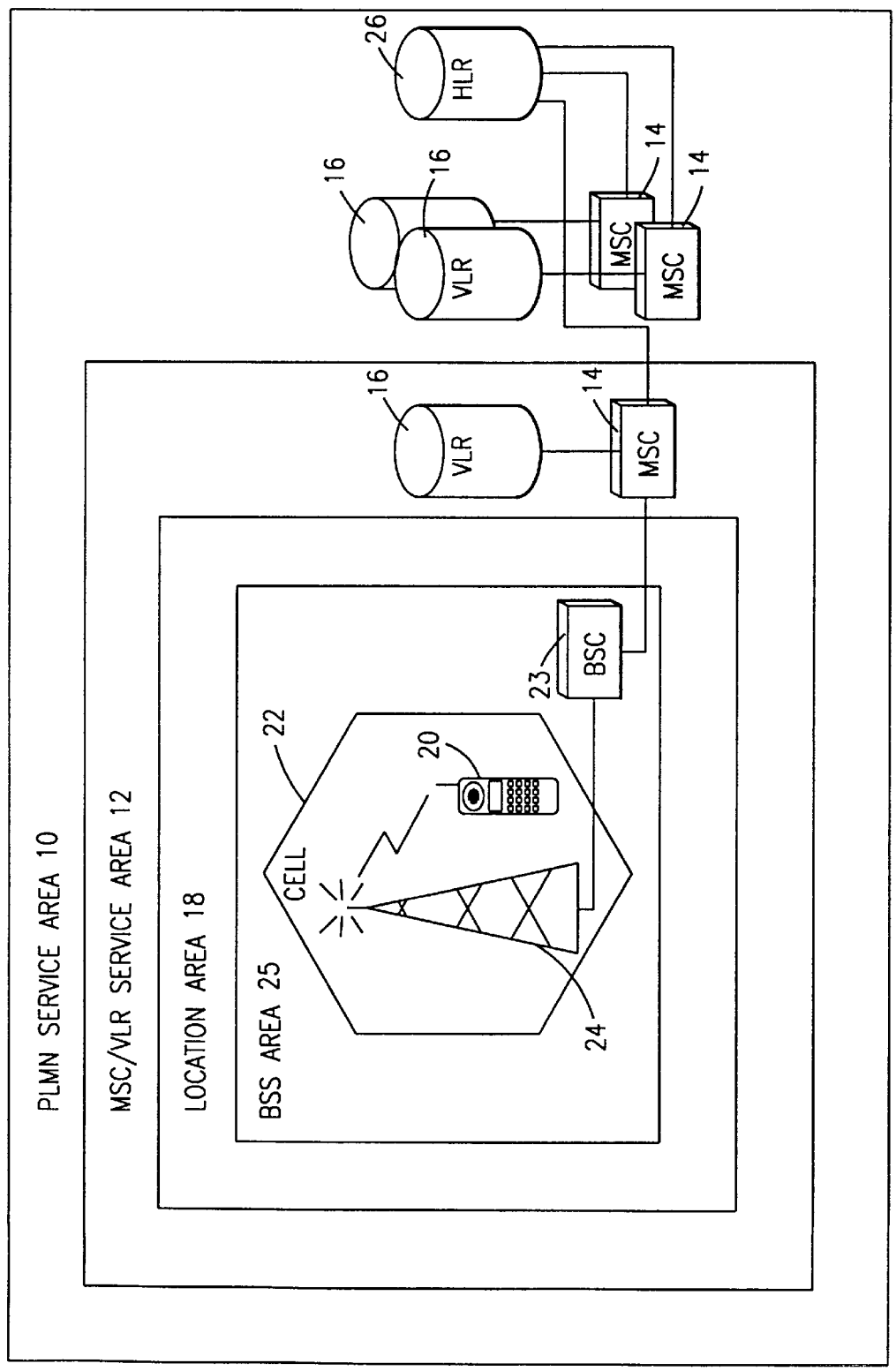
FIG. 1 is a block diagram of a conventional cellular network.
Figure 2:
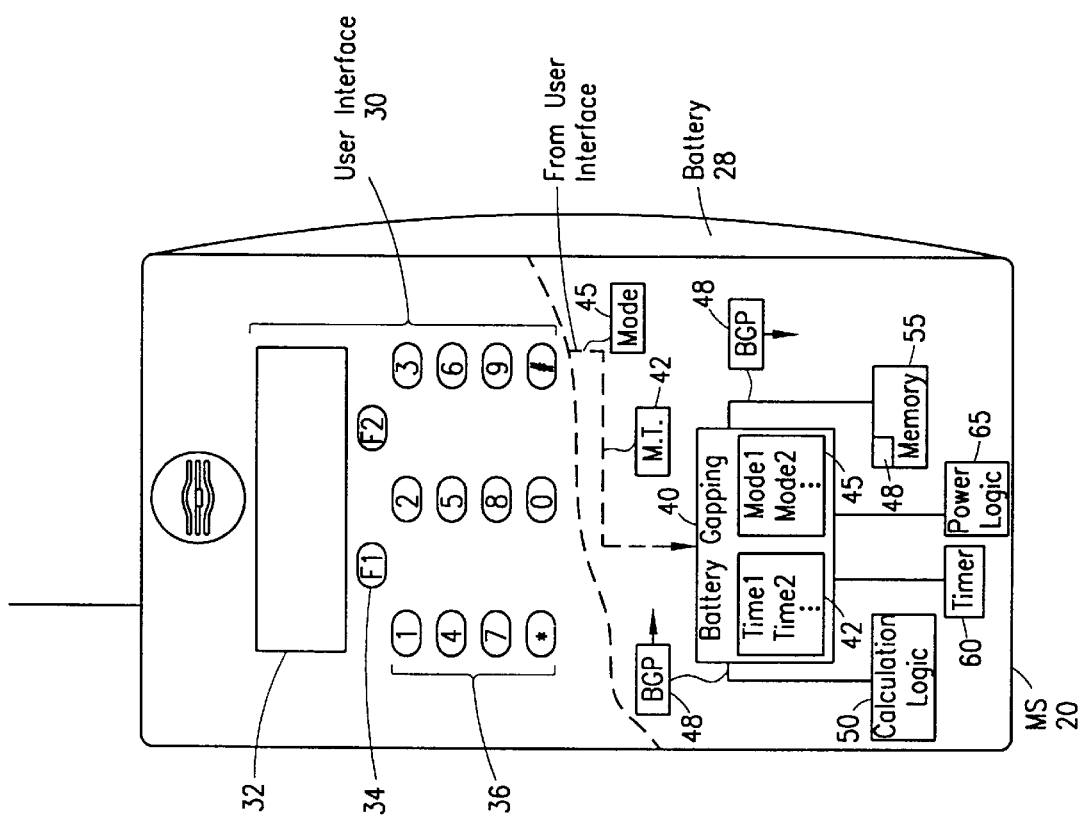
FIG. 2 illustrates a Mobile Station (MS) having a battery gapping feature, in accordance with embodiments of the present invention.

With reference now to FIG. 2 of the drawings, a Mobile Station (MS) 20 is illustrated having a battery gapping feature 40 therein for extending the life of a battery 28 associated with the MS 20. On a display 32 of the MS 20, a menu of subscriber features can be displayed. From this menu, a mobile subscriber (hereinafter referred to as a user) can select the battery gapping feature 40 using function keys 34 on a keypad 36 of the MS 20 or other type of selection method, such as voice recognition or touch screen. The display 32 and selection method, such as function keys 34, together form a user interface 30. Once selected, the battery gapping feature 40 will prompt the user to define a desired battery gapping mode 45 through the user interface 30. The battery gapping mode 45 is a combination of the stand-by with MS 20 power on and the stand-by with MS 20 power off modes. While the battery gapping mode 45 is activated, the battery 28 life will be somewhat shorter than the stand-by with power off mode, but longer than the stand-by with power on mode.

For example, on the display 32, the battery gapping feature 40 can provide several different battery life choices to the user, e.g., 250 hours, 300 hours, 350 hours or 400 hours. Each of these battery life choices is associated with a different battery gapping mode 45. Based upon the desired battery life, the user can select one of these battery gapping modes 45, using the function keys 34 or other selection method indicated on the display 32.

Once the battery gapping mode 45 has been selected by the user, the battery gapping feature 40 accesses calculation logic 50 within the MS 20 to calculate battery gapping parameters 48 associated with the selected battery gapping mode 45. For example, the calculation logic 50 can calculate the amount of time that the MS 20 should be powered off and powered on in order to provide the desired amount of life for the battery 28. As an example, if the desired battery life is 350 hours from the time that the user selects this battery gapping mode 45, the calculation logic 50 may determine that the MS 20 must be powered off in thirty seconds, remain powered off for twenty minutes, power on for twenty minutes, then power off again for another twenty minutes, and so on until the end of the 350 hours is reached in order for the battery life to extend to the desired 350 hours. Preferably, these battery gapping parameters 48 are displayed on the MS display 32 to the user to confirm that the user wants to enter into the selected battery gapping mode 45.

After the calculation logic 50 has calculated these battery gapping parameters 48 and the user confirms the selection of the battery gapping mode 45, the battery gapping feature 40 stores these battery gapping parameters 48 in a memory 55 within the MS 20. This memory 55 could be a memory 55 dedicated to the battery gapping feature 40 or could be a memory 55 already existing within the MS 20, such as a Subscriber Identity Module (SIM) card. In addition, once the battery gapping parameters 48 are stored, the battery gapping feature 40 initiates a timer 60 within the MS 20 for the amount of time before the next action must be taken by the battery gapping feature 40. For example, using the example discussed above, the timer 60 would first be initialized to thirty seconds, at the expiration of which, the battery gapping feature 40 would activate power logic 65 within the MS 20 to power off the MS 20. At the time of powering off, the battery gapping feature 40 would reinitialize the timer 60 to twenty minutes, at the expiration of which, the power logic 65 would power back on the MS 20. This process of alternating between power off and power on states depending upon the calculated stand-by times continues until the battery life has been depleted, which should occur at the user-selected battery life time, e.g., 350 hours from activation of the battery gapping feature 40.

If the user expects to make and/or receive any calls during the battery gapping time, the user may also define a maximum talk time 42 per call in order to prolong the life of the battery 28. For example, after selecting the battery gapping feature 40 from the menu and entering the desired battery gapping mode 45, the battery gapping feature 40 can request a maximum talk time 42 from the user. The battery gapping feature 40 can display a list of talk time choices on the display 32 to the user or the user can manually enter a maximum talk time 42 using keys 34 on the keypad 36. The user may also provide an indication (not shown) of the estimated number of calls to and/or from the MS 20 expected to occur during the battery gapping time. The battery gapping feature 40 can provide this maximum talk time 42 and estimated number of calls to the calculation logic 50, which can use these figures along with the selected battery gapping mode 45 to calculate the battery gapping parameters 48. In addition, the user may also specify other parameters (not shown), such as the number of batteries 28 he or she has, in order to determine the battery gapping parameters 48.

Figure 3A:
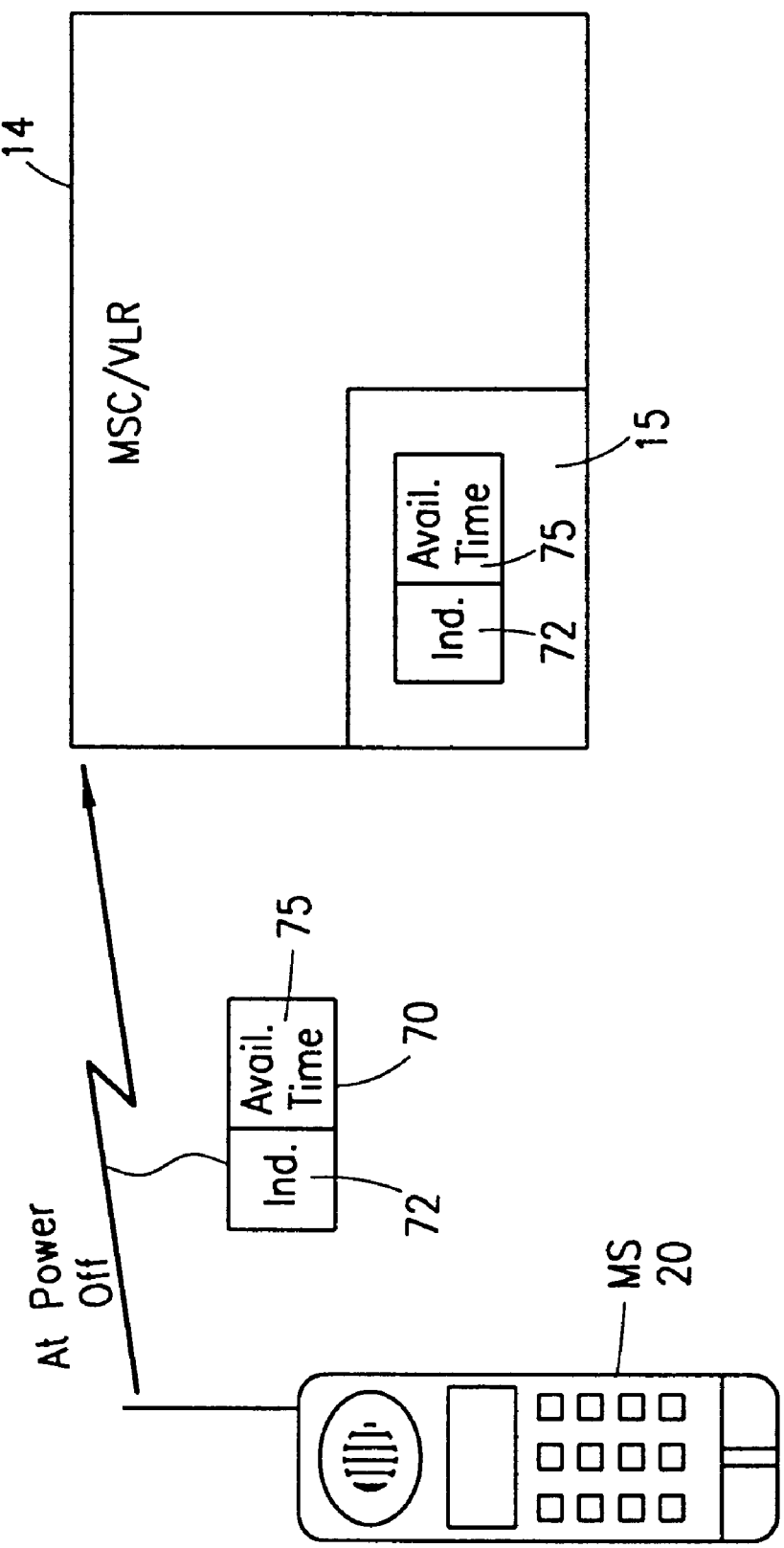
FIGS. 3A and 3B illustrate sample implementations of the battery gapping feature in accordance with embodiments of the present invention.

With reference now to FIG. 3A of the drawings, once the battery gapping feature 40 has been activated, the MS 20 can inform a serving Mobile Switching Center/Visitor Location Register (MSC/VLR) (hereinafter referred to as reference number 14) of the activation of the battery gapping feature 40 when the MS 20 first powers off. Conventionally, when the MS 20 powers off, the MS 20 transmits an IMSI detach signal (not shown) to the MSC/VLR 14 to indicate to the MSC/VLR 14 that the MS 20 is powering off. Upon receipt of the IMSI detach message, the MSC/VLR 14 marks an IMSI detach flag (not shown) associated with the MS 20. After this, no paging is performed to the MS 20, and all calls to the MS 20 either go unanswered or are forwarded to a voice mail system (not shown) associated with the MS 20.

With the battery gapping feature 40, when the MS 20 powers off, in addition to the IMSI detach message, the MS 20 transmits a battery gapping message 70, which could be included with the IMSI detach message, to the MSC/VLR 14. The battery gapping message 70 includes an indication 72 that the MSC/VLR 14 that the MS 20 has activated the battery gapping feature 40, as well as preferably indicating a time 75 that the MS 20 will power on again. This indication 72 and available time 75 are stored in a subscriber record 15 associated with the MS 20 within the MSC/VLR 14.

Figure 3B:
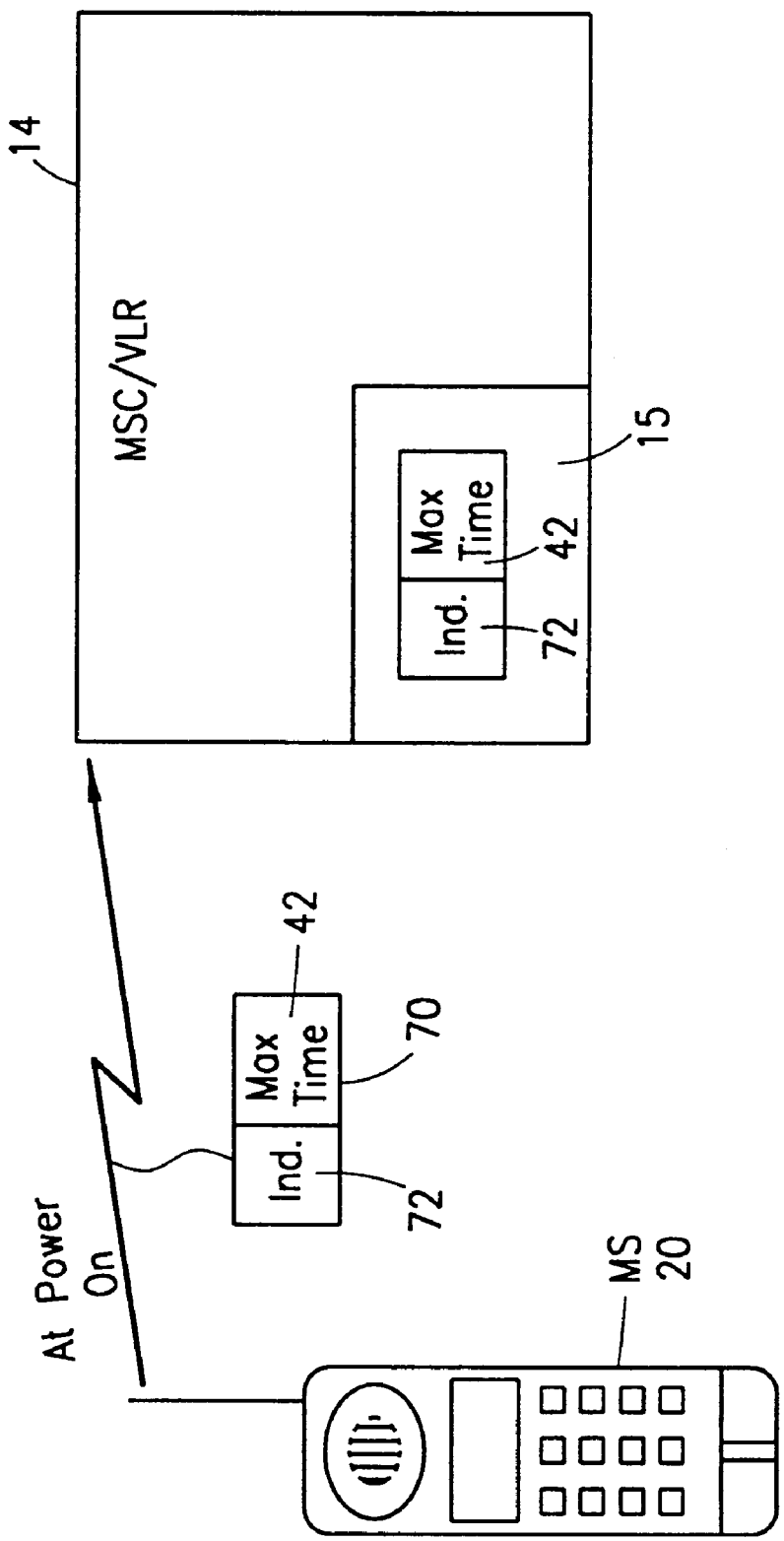

Referring now to FIG. 3B, once the MS 20 powers on again, the MS 20 alerts the mobile subscriber that the MS 20 has powered back on again by providing a tone or other type of announcement to the mobile subscriber. In addition, the MS 20 sends an IMSI attach message (not shown), along with the battery gapping message 70, which includes the indication 72, to the MSC/VLR 14 if the MS 20 is turned on in the same Location Area (LA) as it was when the MS 20 sent the IMSI detach message. Otherwise, the MS 20 must perform a location update, along with transmitting the battery gapping message 70, to the MSC/VLR 14, which could be a different MSC/VLR 14 than MSC/VLR 14 serving the MS 20 when the MS 20 sent the IMSI detach message. If the user has requested a maximum talk time 42 per call, the battery gapping message 70 can include, in addition to the indication 72, this maximum talk time 42, for use by the MSC/VLR 14 in later call handling. This maximum talk time 42 and the indication 72 that the battery gapping feature 40 is active are stored in the subscriber record 15 in the MSC/VLR 14.

Figure 4:
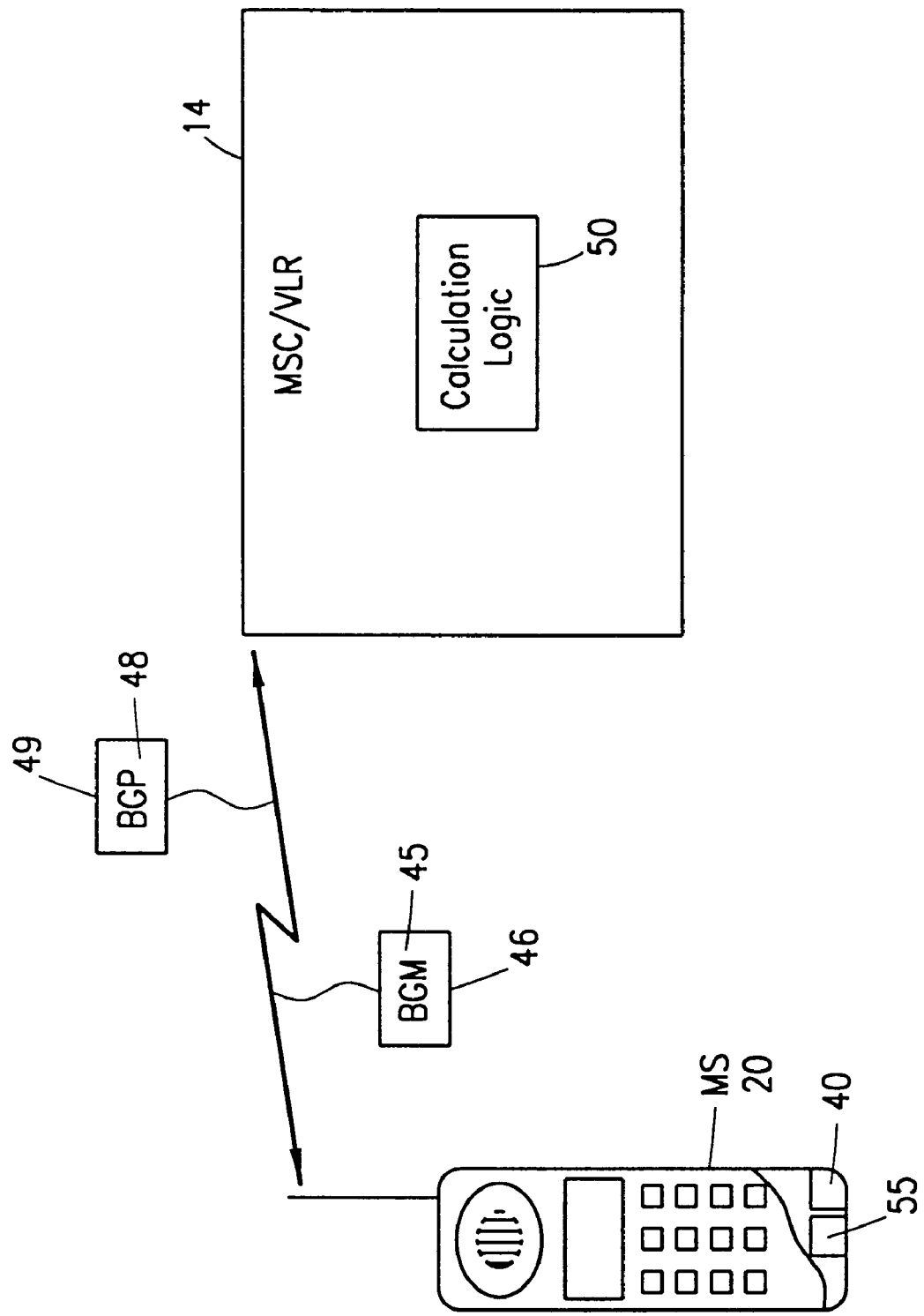
FIG. 4 illustrates calculation of battery gapping parameters by a mobile switching center in wireless communication with a mobile station in accordance with alternative embodiments of the present invention.

In an alternative embodiment, as shown in FIG. 4 of the drawings, instead of the calculation logic 50 residing within the MS 20, the calculation logic 50 could reside within the MSC/VLR 14. Thus, when the battery gapping feature 40 is activated, the MS 20 can transmit a Short Message Service (SMS) message or Unstructured Supplementary Service Data (USSD) message 46 to the MSC/VLR 14 including the selected battery gapping mode 45, along with any other parameters entered by the user. Thereafter, the calculation logic 50 within the MSC/VLR 14 can calculate the battery gapping parameters 48, and transmit these parameters 48, using an SMS or USSD message 49, to the MS 20 for storage in the memory 55 within the MS 20. The battery gapping feature 40 can use these battery gapping parameters 48 to turn the MS 20 power on and off, as discussed hereinbefore.

Figure 5A:
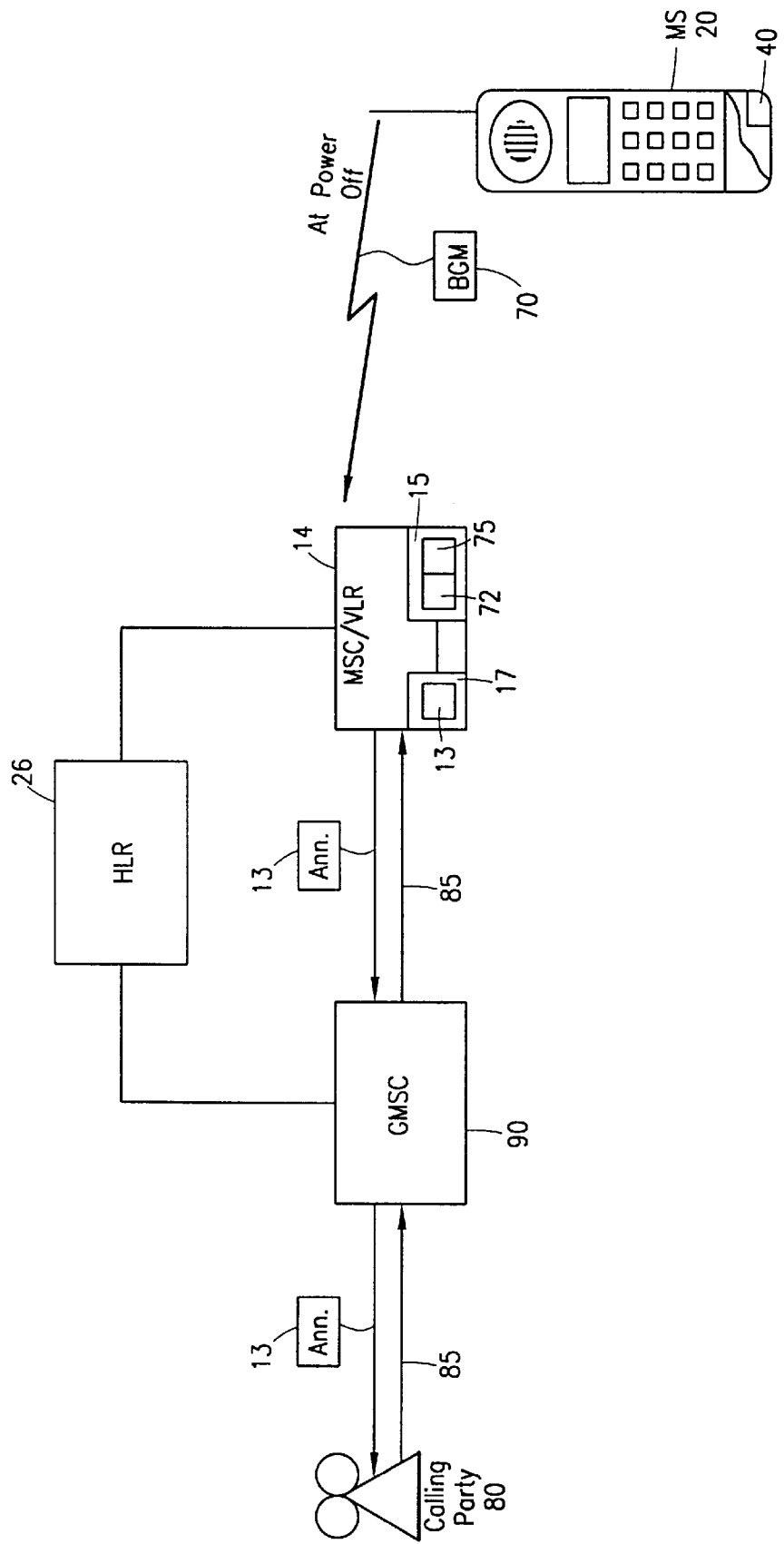
FIG. 5A illustrates call handling treatment for an incoming call to an MS having the battery gapping feature while the MS is powered off, in accordance with embodiments of the present invention.
Figure 5B:
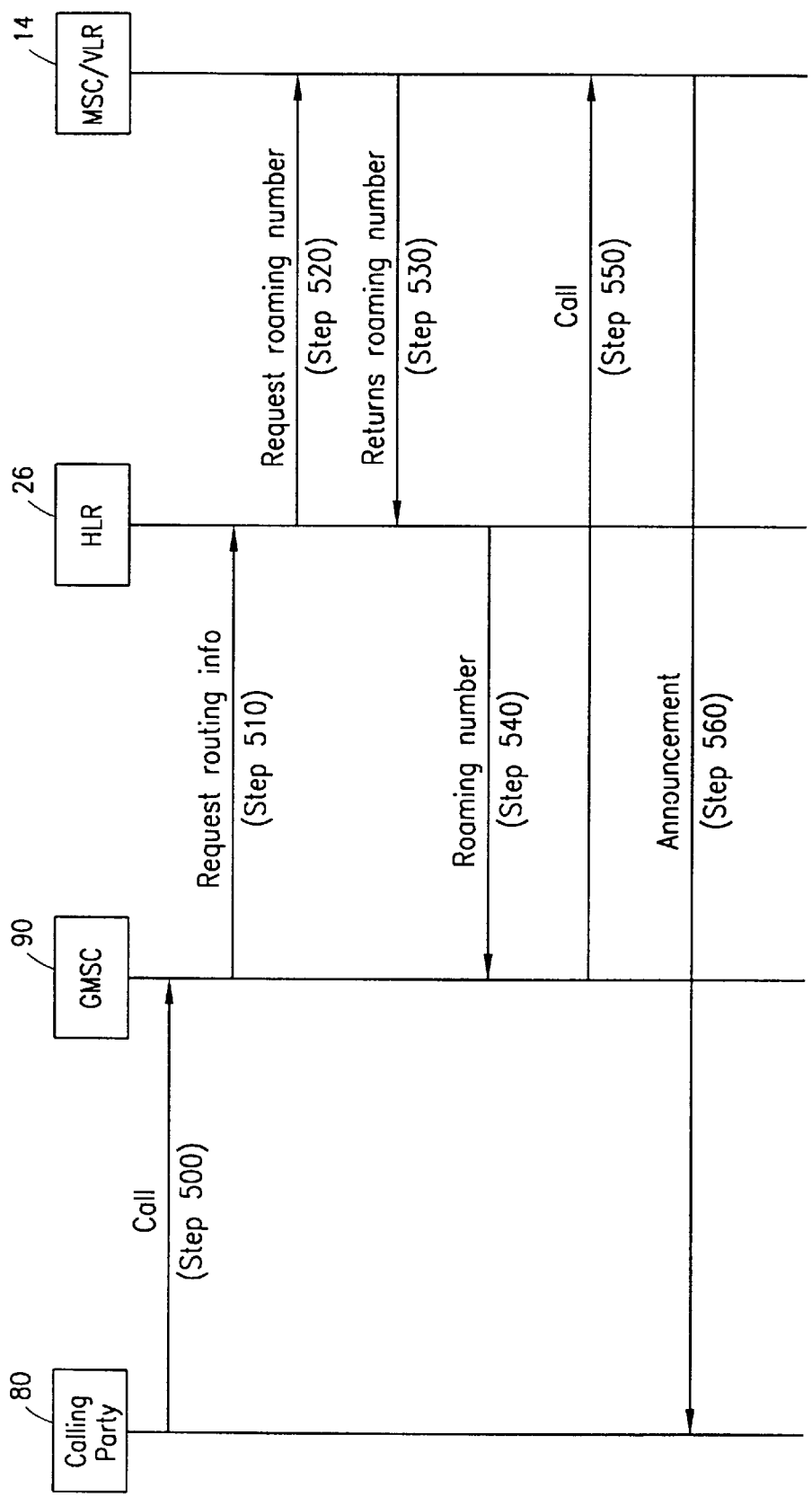
FIG. 5B is a signaling diagram for the call handling treatment shown in FIG. 4 of the drawings.

With reference now to FIG. 5A of the drawings, which will be described in connection with the signaling diagram shown in FIG. 5B of the drawings, call handling of an incoming call placed to the MS 20 while the MS 20 is powered off and has the battery gapping feature 40 activated is shown. When a calling party 80 places a call 85 to the MS 20, the call 85 is routed to a Gateway Mobile Switching Center (GMSC) 90 (step 500). The GMSC 90 determines a Home Location Register (HLR) 26 for the MS 20, and sends a query to the HLR 26 requesting routing information for the call 85 (step 510), e.g., the address for the serving MSC/VLR 14. The HLR 26 determines which MSC/VLR 14 is currently serving the MS 20 and requests a roaming number that identifies the MSC/VLR 14 from the MSC/VLR 14 (step 520). The MSC/VLR 14 returns a roaming number to the HLR 26 (step 530), which in turn, forwards the roaming number to the GMSC 90 (step 540).

Thereafter, the GMSC 90 reroutes the call to the MSC/VLR 14 (step 550). Since the MS 20 is marked as IMSI detached, the MSC/VLR 14 does not page the MS 20. Conventionally, as discussed above, the call would either go unanswered or be forwarded to voice mail. However, when the MSC/VLR 14 received the battery gapping message 70 from the MS 20, the MSC/VLR 14 stored the indication 72 and available time 75 in the subscriber record 15 associated with the MS 20. Therefore, when the call 85 comes in to the MSC/VLR 14 (step 550), the MSC/VLR 14 knows that the MS 20 has activated the battery gapping feature 40, and the expected time 75 that the MS 20 will power on again.

Thus, in response to the incoming call, the MSC/VLR 14 can access an announcement machine 17 within the MSC/VLR 14 and transmit an announcement 13 to the calling party 80 indicating that the MS 20 has activated the battery gapping feature and/or that the MS 20 will not be available until the time 75 provided by the MS 20 in the battery gapping message 70 (step 560). For example, the announcement 13 could say: "We're sorry. Your call cannot be completed at this time. The party you are calling has activated a battery gapping feature and will not be available again until 2:00 CST." At this time, the MSC/VLR 14 can disconnect the call 85 (step 570) or forward the call 85 to the voice mail system associated with the MS 20, the former being illustrated.

Figure 6:
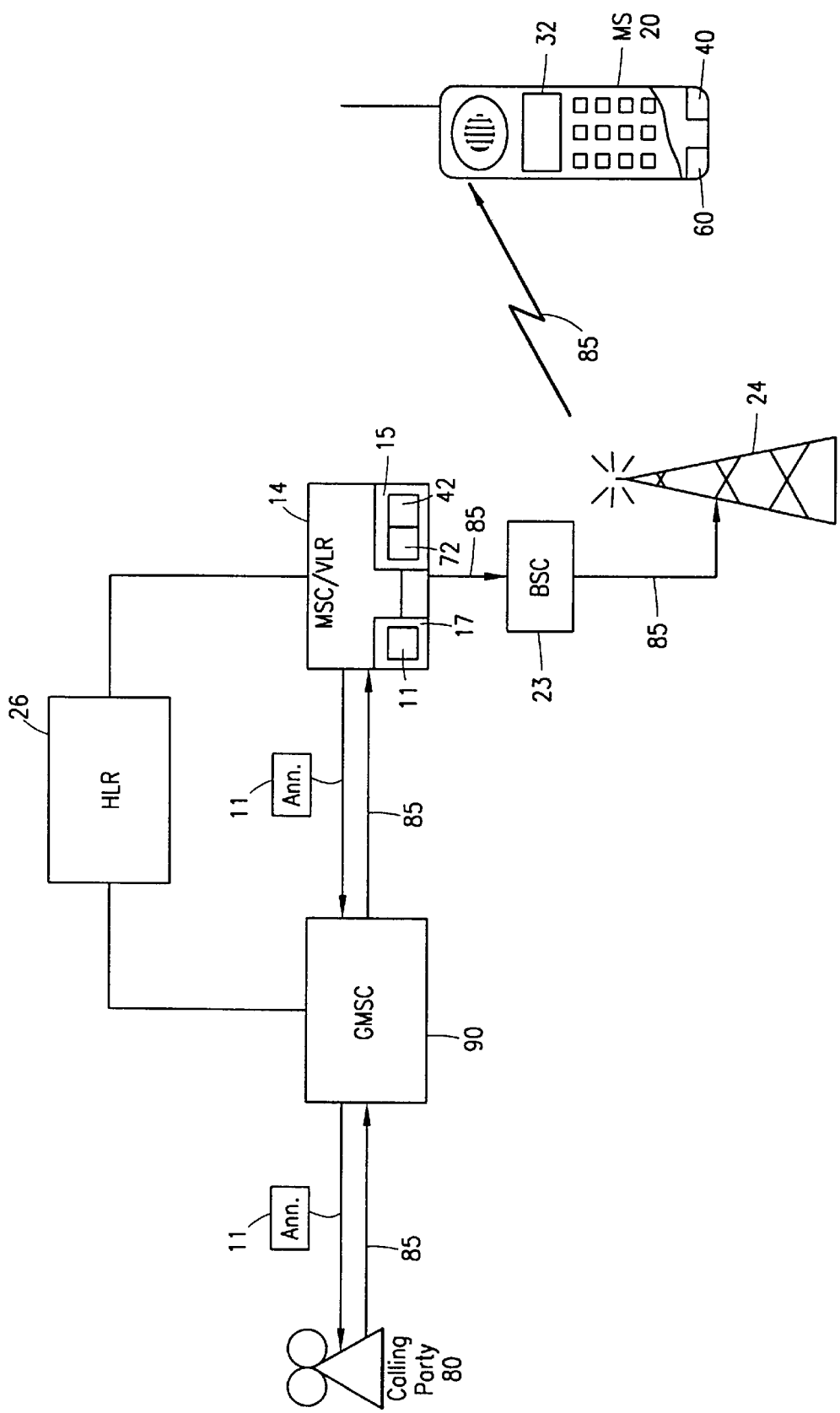
FIG. 6 illustrates call handling treatment for an incoming call to an MS having the battery gapping feature while the MS is powered on, in accordance with embodiments of the present invention.
Figure 7:
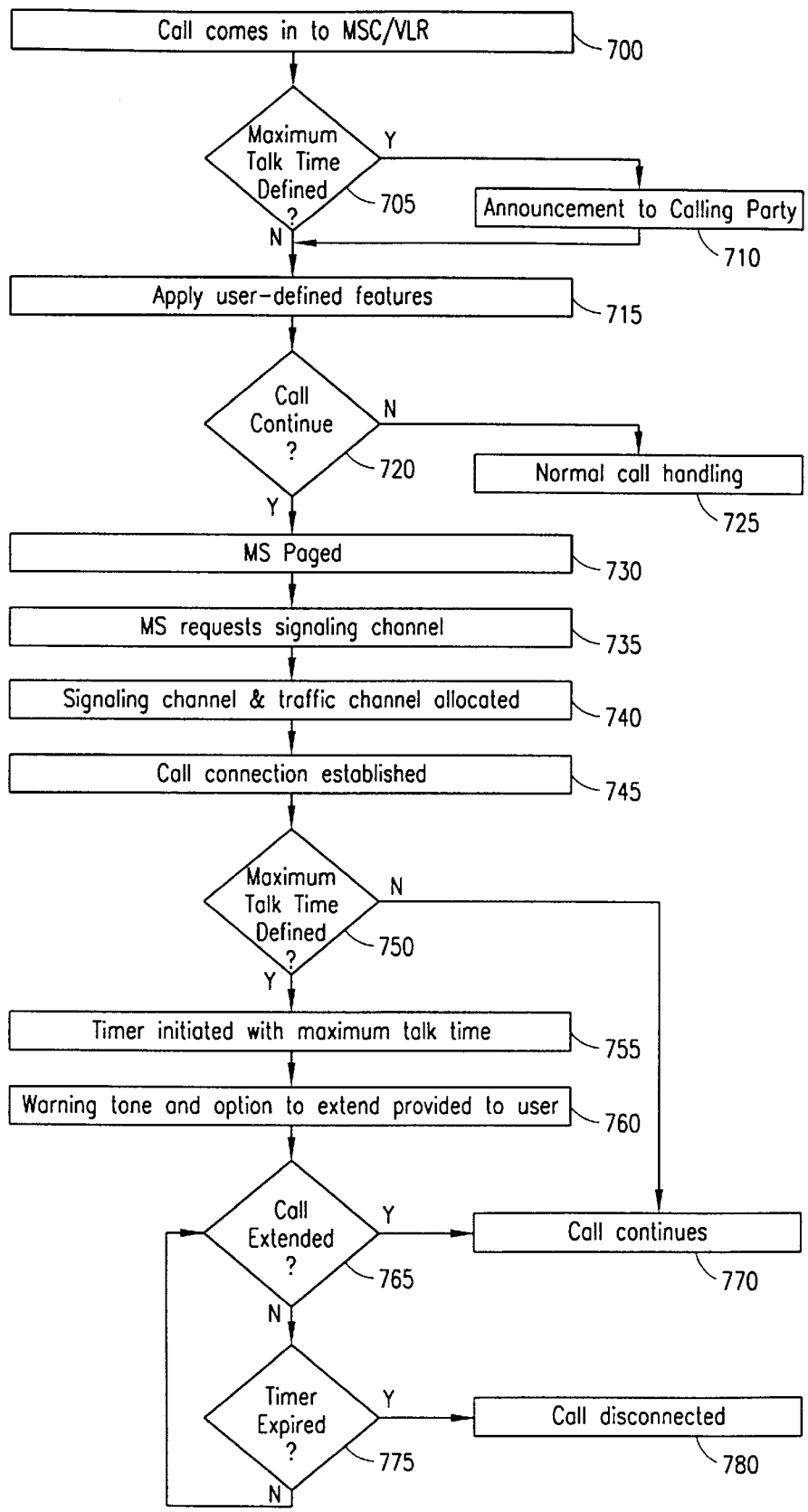
FIG. 7 illustrates steps for implementing the call handling treatment shown in FIG. 6 of the drawings.

With reference now to FIG. 6 of the drawings, which will be described in connection with the steps listed in FIG. 7 of the drawings, call handling of an incoming call 85 to the MS 20 while the MS 20 is powered on and has the battery gapping feature 40 activated is illustrated. As described above, when the incoming call 85 from the calling party 80 is routed to the GMSC 90, the GMSC 90 requests routing information for the call 85 from the HLR 26, e.g., the address for the serving MSC/VLR 14. The HLR 26 obtains a roaming number from the MSC/VLR 14, and forwards this roaming number to the GMSC 90.

Thereafter, the GMSC 90 reroutes the call 85 to the MSC/VLR 14 (step 700). When the incoming call 85 arrives at the MSC/VLR 14, if the user has defined a maximum talk time 42 per call (step 705), the calling party 80 is preferably notified by the MSC/VLR 14 through another announcement 11 from the announcement machine 17 that the battery saving feature 40 has been activated by the MS 20 and that the connection time is limited to a certain duration 42 (step 710), e.g., two minutes.

In addition, the user may have defined call handling treatment for calls received while the battery gapping feature 40 is activated. For example, the user may have defined a call screening list while the battery gapping feature 40 is activated. Therefore, the MSC/VLR 14 may apply user defined features to the call 85 (step 715). If, after applying these features, the MSC/VLR 14 determines that the call 85 cannot be setup to the called MS 20 (step 720), the MSC/VLR 14 applies normal call handling to the call 85 (step 725), such as forwarding the call 85 to voice mail or disconnecting the call 85.

However, if the call 85 is allowed to be setup to the MS 20 (step 720), the MSC/VLR 14 pages the MS 20 via a serving Base Station Controller (BSC) 23 and Base Transceiver Station (BTS) 24 (step 730). When the MS 20 detects the page, the MS 20 sends a request for a signaling channel to the serving BSC 23 (step 735). Thereafter, the BSC 23 provides a signaling channel to setup the call, and allocates a traffic channel to the MS 20 (step 740). Once the MS 20 rings and the user answers the call, the call 85 connection is established (step 745).

Once the call 85 connection is established, if the user defined a maximum talk time 42 (step 750), the timer 60 within the MS 20 is initiated with the user defined maximum talk time 42 (step 755). Preferably, prior to the timer 60 expiring, the MS 20 provides a warning tone to the user and provides an option to the user to extend the call 85 and deactivate the timer 60 (step 760). For example, with the warning tone, the battery gapping feature 40 could display a message (not shown) on the MS display 32 to the user inquiring whether the user would like to extend the call 85. If the user would like to extend the call 85, the user can inform the battery gapping feature 40 by pressing appropriate function keys 34 on the MS 20 or by communicating this to the battery gapping feature 40 some other way, e.g., voice recognition or touch screen. If the call 85 is extended (step 765) or if a maximum talk time 42 was not defined by the user (step 750), the call 85 continues normally until both parties "hang up" (step 770). Otherwise, when the timer 60 expires (step 775), the MS 20 disconnects the call 85 (step 780).

It should be noted that in an alternative embodiment, the timer 60 can be within the MSC/VLR 14. Thus, when the call 85 connection is established, the MSC/VLR 14 can initiate the timer 60, provide the message asking whether the user would like to extend the call to the MS 20, using an SMS or USSD message, and disconnect the call 85 if the user does not respond to the message once the timer 60 expires.

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

What is claimed is:

1. A mobile station for extending the life of a battery associated with the mobile station, comprising:
   power logic for controlling powering on and powering off of said mobile station;
   a battery gapping feature for enabling selection of a battery gapping mode by a user of said mobile station, said battery gapping mode being associated with a user-defined length of time for the entire life of said battery, said battery gapping feature determining battery gapping parameters based on said selected battery gapping mode and activating said power logic based on said battery gapping parameters; and
   a memory for storing said battery gapping parameters.

2. The mobile station of claim 1, wherein said battery gapping mode is an indication of an amount of time that the battery may supply power to said mobile station.

3. The mobile station of claim 1, wherein said battery gapping parameters comprise at least a duration of time that said mobile station is in a power on state and a duration of time that said mobile station is in a power off state.

4. The mobile station of claim 3, further comprising:
   a timer for monitoring the amount of time said mobile station is in said power on state and said power off state.

5. The mobile station of claim 1, further comprising:
   a user interface for receiving an input selecting said battery gapping mode from said user.

6. The mobile station of claim 1, wherein said battery gapping feature enables selection of a maximum talk time by said user.

7. The mobile station of claim 6, further comprising:
   a timer for monitoring a duration of a call connection established with said mobile station, said timer being initiated with said maximum talk time.

8. A method for extending the life of a battery associated with a mobile station, comprising the steps of:
   selecting a battery gapping mode by a user of said mobile station said battery gapping mode being associated with a user-defined length of time for the entire life of said battery;
   determining battery gapping parameters based on said selected battery gapping mode; and
   controlling power logic of said mobile station to power on and power off said mobile station based on said battery gapping parameters.

9. The method of claim 8, further comprising the step of:
   storing said battery gapping parameters in a memory within said mobile station.

10. The method of claim 8, wherein said battery gapping parameters comprise at least a duration of time that said mobile station is in a power on state and a duration of time that said mobile station is in a power off state.

11. The method of claim 10, wherein said step of controlling further comprises the steps of:
    powering on said mobile station, using said power logic, for said duration of time said mobile station is in said power on state.

12. The method of claim 11, wherein said step of controlling further comprises the steps of:
    powering off said mobile station, using said power logic, upon expiration of said duration of time said mobile station is in said power on state for said duration of time said mobile station is in said power off state.

13. The method of claim 8, wherein said step of determining further comprises the step of:
    calculating said battery gapping parameters by said battery gapping feature.

14. The method of claim 8, wherein said step of determining further comprises the steps of:
    transmitting said selected battery gapping mode from said mobile station to a mobile switching center in wireless communication with said mobile station;
    calculating said battery gapping parameters by said mobile switching center; and
    transmitting said battery gapping parameters from said mobile switching center to said mobile station.

15. The method of claim 8, wherein said step of selecting further comprises the step of:
    selecting a maximum talk time by said user.

16. The method of claim 15, further comprising the steps of:
    establishing a call connection with said mobile station; and
    initiating a timer with said maximum talk time.

17. The method of claim 16, further comprising the step of:
    disconnecting said call connection when said timer expires.

18. The method of claim 16, further comprising the steps of:
    receiving an indication to extend said call connection past said maximum talk time from said user; and
    deactivating said timer in response to said indication.

19. The method of claim 16, further comprising the step of:
    providing an announcement to a calling party associated with said call connection from a mobile switching center in wireless communication with said mobile station, said announcement indicating said call connection has said maximum talk time associated therewith.

20. The method of claim 8, wherein said step of controlling further comprises the step of:
- transmitting a battery gapping message to a mobile switching center in wireless communication with said mobile station, said battery gapping message indicating said selected battery gapping mode has been activated.

21. The method of claim 20, wherein said step of transmitting further comprises the step of:
- transmitting an available time for said mobile station to said mobile switching center, said available time indicating a time that said mobile station will next be in a power on state.

22. The method of claim 21, further comprising the steps of:
- receiving at said mobile switching center a call for said mobile station from a calling party;
- determining that said mobile station has said selected battery gapping mode activated; and
- providing an announcement to said calling party indicating that said mobile station has said selected battery gapping mode activated, said announcement including said available time.

23. The method of claim 20, wherein said step of transmitting further comprises the step of:
- transmitting a maximum talk time for said mobile station to said mobile switching center, said maximum talk time indicating a maximum duration of a call connection associated with said mobile station.

24. A telecommunications system for managing availability of mobile subscribers, comprising:
- a mobile station having a battery and power logic for controlling powering on and powering off of said mobile station therein, said mobile station further having a battery gapping feature therein for extending the life of said battery by enabling selection of a battery gapping mode by a user of said mobile station, said battery gapping feature determining battery gapping parameters based on said selected battery gapping mode and activating said power logic based on said battery gapping parameters; and
- a mobile switching center in wireless communication with said mobile station for receiving a battery gapping message from said mobile station, said battery gapping message indicating said selected battery gapping mode has been activated.

25. The telecommunications system of claim 24, wherein said mobile station further comprises:
- a memory for storing said battery gapping parameters.

26. The telecommunications system of claim 24, wherein said battery gapping mode is an indication of an amount of time that said battery may supply power to said mobile station.

27. The telecommunications system of claim 24, wherein said battery gapping parameters comprise at least a duration of time that said mobile station is in a power on state and a duration of time that said mobile station is in a power off state.

28. The telecommunications system of claim 27, wherein said mobile station further comprises:
- a timer for monitoring the amount of time said mobile station is in said power on state and said power off state.

29. The telecommunications system of claim 27, wherein said battery gapping message includes an available time for said mobile station, said available time indicating a time that said mobile station will next be in a power on state.

30. The telecommunications system of claim 29, wherein said mobile switching center further comprises:
- an announcement machine for transmitting an announcement to a calling party attempting to establish a call connection with said calling party, said announcement indicating that said mobile station has said battery gapping mode activated, said announcement including said available time.

31. The telecommunications system of claim 24, wherein said mobile station further comprises:
- a user interface for receiving an input selecting said battery gapping mode from said user.

32. The telecommunications system of claim 24, wherein said battery gapping feature enables selection of a maximum talk time by said user.

33. The telecommunications system of claim 30, wherein said mobile station further comprises:
- a timer for monitoring a duration of a call connection established with said mobile station, said timer being initiated with said maximum talk time.

34. The telecommunications system of claim 30, wherein said battery gapping message includes said maximum talk time.

35. The telecommunications system of claim 34, wherein said mobile switching center further comprises:
- an announcement machine for transmitting an announcement to a calling party that has established a call connection with said mobile station, said announcement including said maximum talk time.

* * * * *